(12) United States Patent
Mullis

(10) Patent No.: US 7,540,553 B1
(45) Date of Patent: Jun. 2, 2009

(54) VISOR EXTENSION DEVICE

(76) Inventor: Hugh R. Mullis, PO Box, White, GA (US) 30184

( * ) Notice: Subject to any disclaimer, the term of this patent is extended or adjusted under 35 U.S.C. 154(b) by 0 days.

(21) Appl. No.: 11/675,630

(22) Filed: Feb. 16, 2007

(51) Int. Cl.
*B60J 3/02* (2006.01)

(52) U.S. Cl. .................... 296/97.8; 296/97.11

(58) Field of Classification Search ............... 296/97.6, 296/97.8
See application file for complete search history.

(56) References Cited

U.S. PATENT DOCUMENTS

| | | | |
|---|---|---|---|
| 4,195,876 A | | 4/1980 | Timperio |
| 4,792,176 A | * | 12/1988 | Karford ................. 296/97.8 |
| 5,259,657 A | | 11/1993 | Arendt et al. |
| 5,316,361 A | * | 5/1994 | Miller .................. 296/97.8 |
| 5,730,484 A | | 3/1998 | Robinson |
| D405,746 S | | 2/1999 | Larson |
| 6,059,347 A | * | 5/2000 | Davalos ................. 296/97.6 |
| 6,139,084 A | * | 10/2000 | Miles ................... 296/97.6 |
| 6,176,539 B1 | | 1/2001 | Westerman |
| 6,309,004 B1 | | 10/2001 | McNutt et al. |
| 6,412,850 B1 | | 7/2002 | Francis et al. |

FOREIGN PATENT DOCUMENTS

| | | | | |
|---|---|---|---|---|
| DE | 3341509 | * | 5/1985 | ............ 296/97.8 |
| DE | 19716084 | * | 10/1998 | |
| GB | 1504700 | * | 3/1978 | ............ 296/97.8 |

* cited by examiner

*Primary Examiner*—Dennis H Pedder

(57) ABSTRACT

A visor extension device for attaching to a sun visor to provide additional screening of bright light beyond a perimeter of the sun visor includes a plate being mountable to the sun visor. A sleeve is slidably mounted to the plate. The sleeve is downwardly extended from the plate to provide additional blocking of light below the sun visor. The sleeve has a slot extending through the sleeve and through opposing ends of the sleeve. Each of the opposing ends of the sleeve slidably receives one of a plurality of extension plates. The extension plates are selectively extendable from the associated one of the opposing ends to block light to the sides of the sun visor.

9 Claims, 6 Drawing Sheets

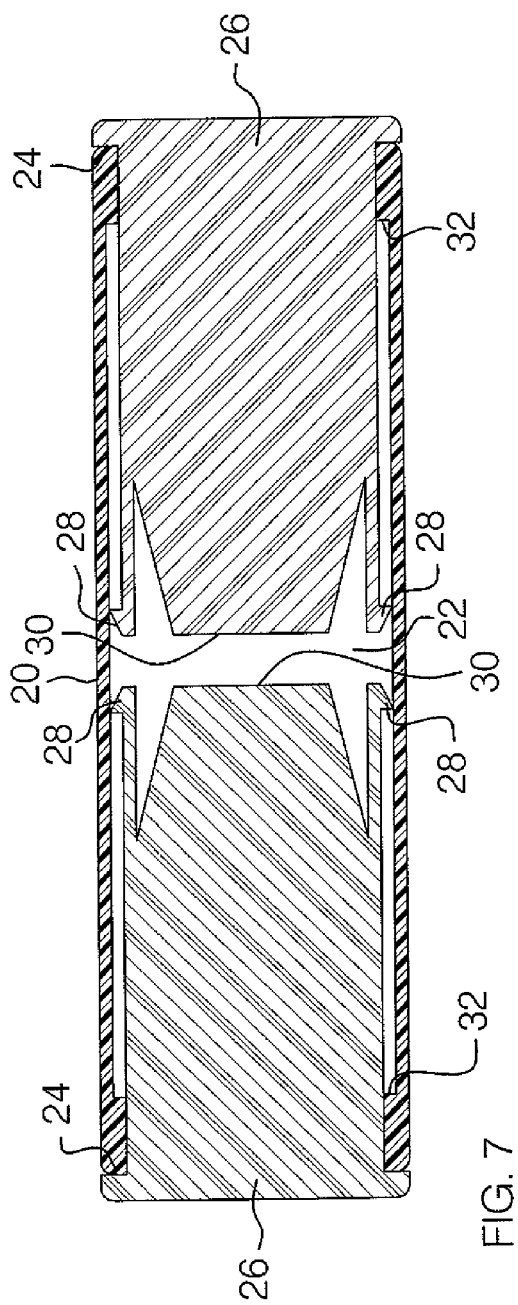
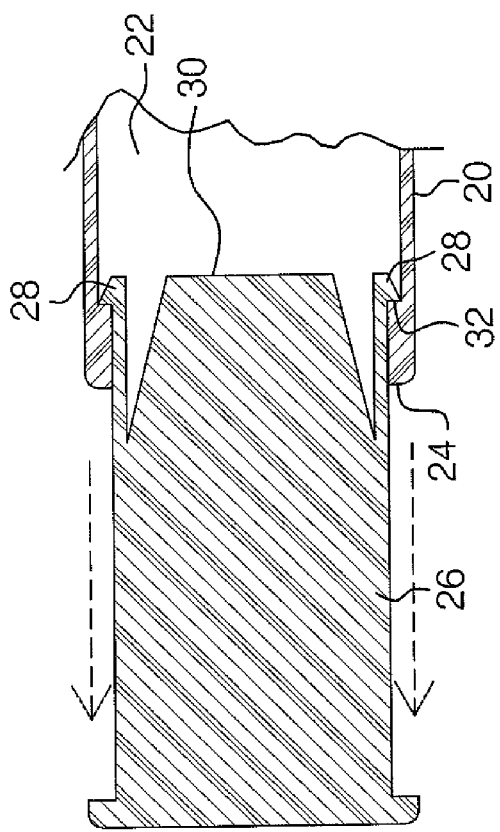
FIG. 7
FIG. 8

VISOR EXTENSION DEVICE

BACKGROUND OF THE INVENTION

1. Field of the Invention

The present invention relates to auxiliary sun visors and more particularly pertains to a new auxiliary sun visor for attaching to a vehicles' sun visor to provide additional screening of bright light beyond a perimeter of the vehicle's sun visor.

2. Description of the Prior Art

The use of auxiliary sun visors is known in the prior art. While these devices fulfill their respective, particular objectives and requirements, the need remains for a device that has certain improved features that allows the device to slide along a face of a sun visor to allow the device to extend below the sun visor and block light passing below the sun visor. Additionally, the device should be extendable beyond sides of the sun visor to block light passing adjacent to the sides of the sun visor.

SUMMARY OF THE INVENTION

The present invention meets the needs presented above by generally comprising a plate being mountable to the sun visor. A sleeve is slidably mounted to the plate. The sleeve is downwardly extended from the plate to provide additional blocking of light below the sun visor. The sleeve has a slot extending through the sleeve and through opposing ends of the sleeve. Each of the opposing ends of the sleeve slidably receives one of a plurality of extension plates. The extension plates are selectively extendable from the associated one of the opposing ends to block light to the sides of the sun visor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a cross-sectional view of the present invention taken along line 7-7 of FIG. 1.

FIG. 8 is a cross-sectional view of the present invention as shown in FIG. 7 with one of the extension panels extended from the sleeve.

DESCRIPTION OF THE PREFERRED EMBODIMENT

Figure 1:
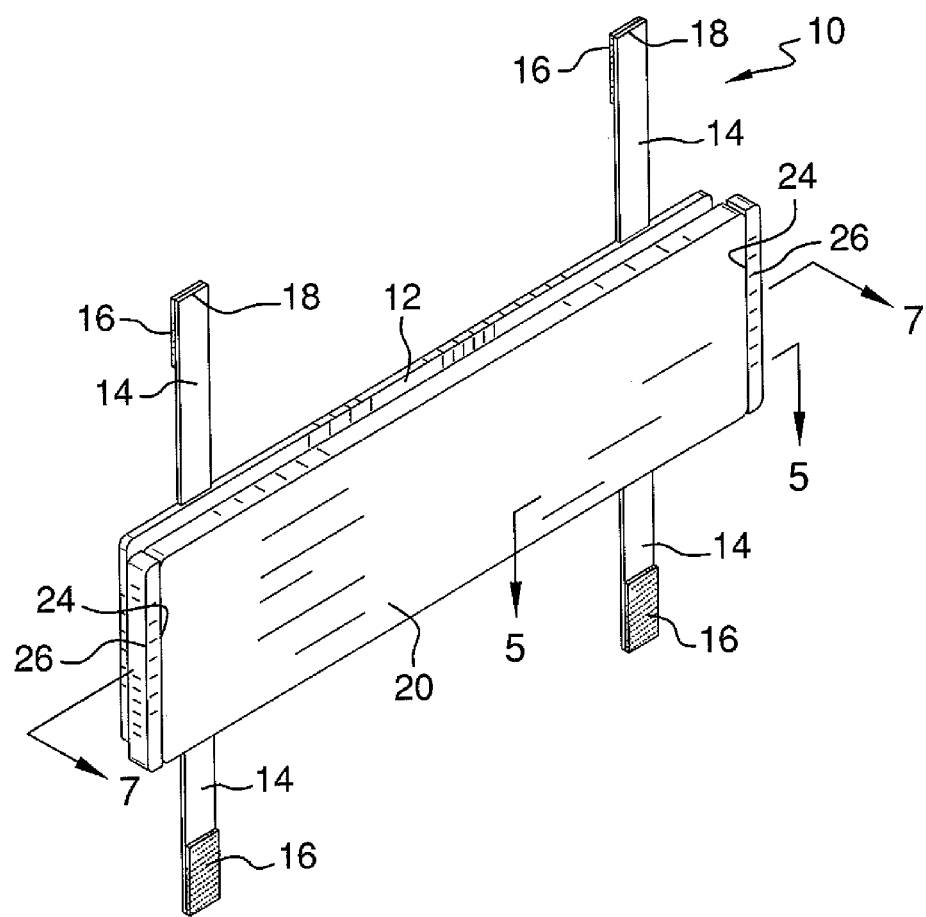
FIG. 1 is a front perspective view of a visor extension device according to the present invention.
Figure 2:
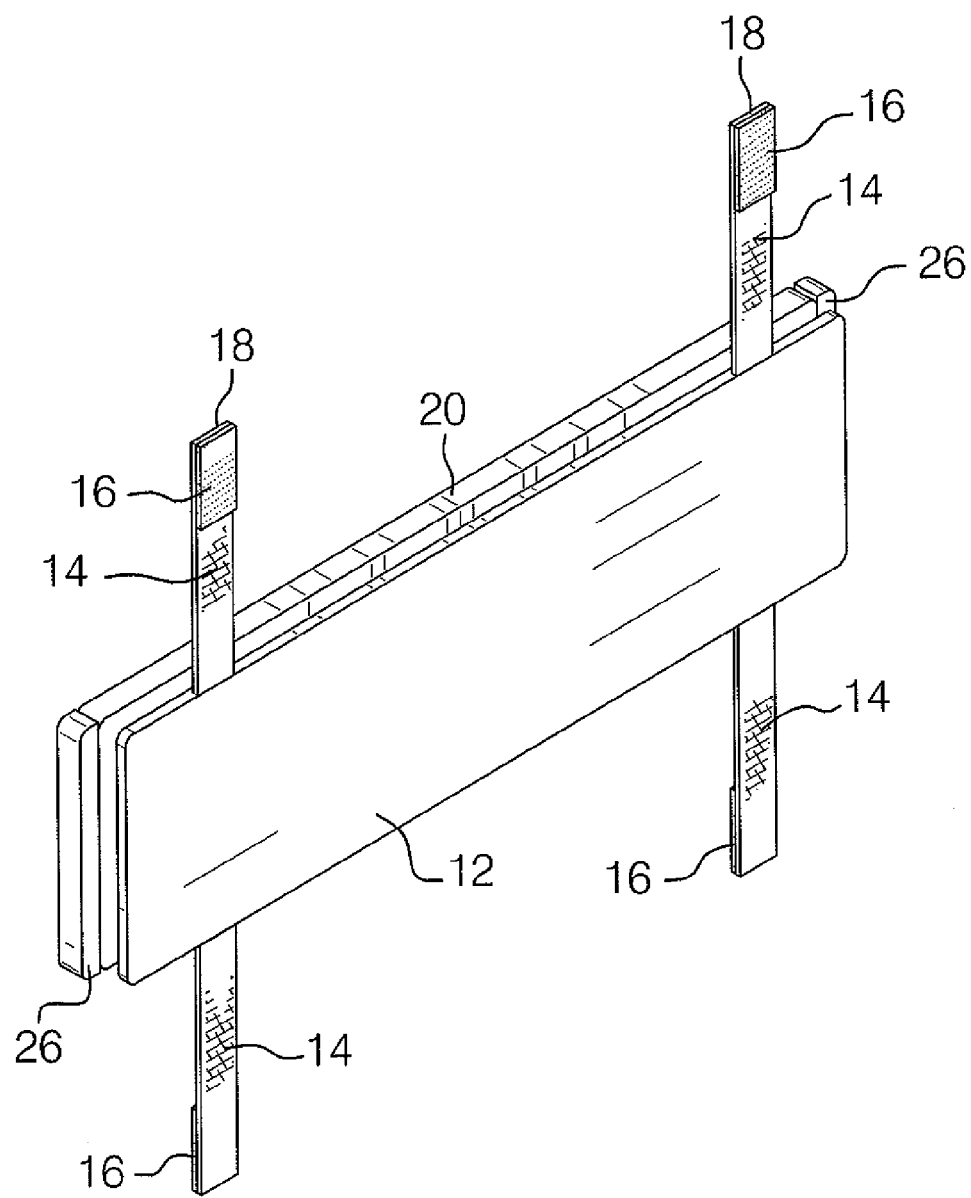
FIG. 2 is a rear perspective view of the present invention.
Figure 3:
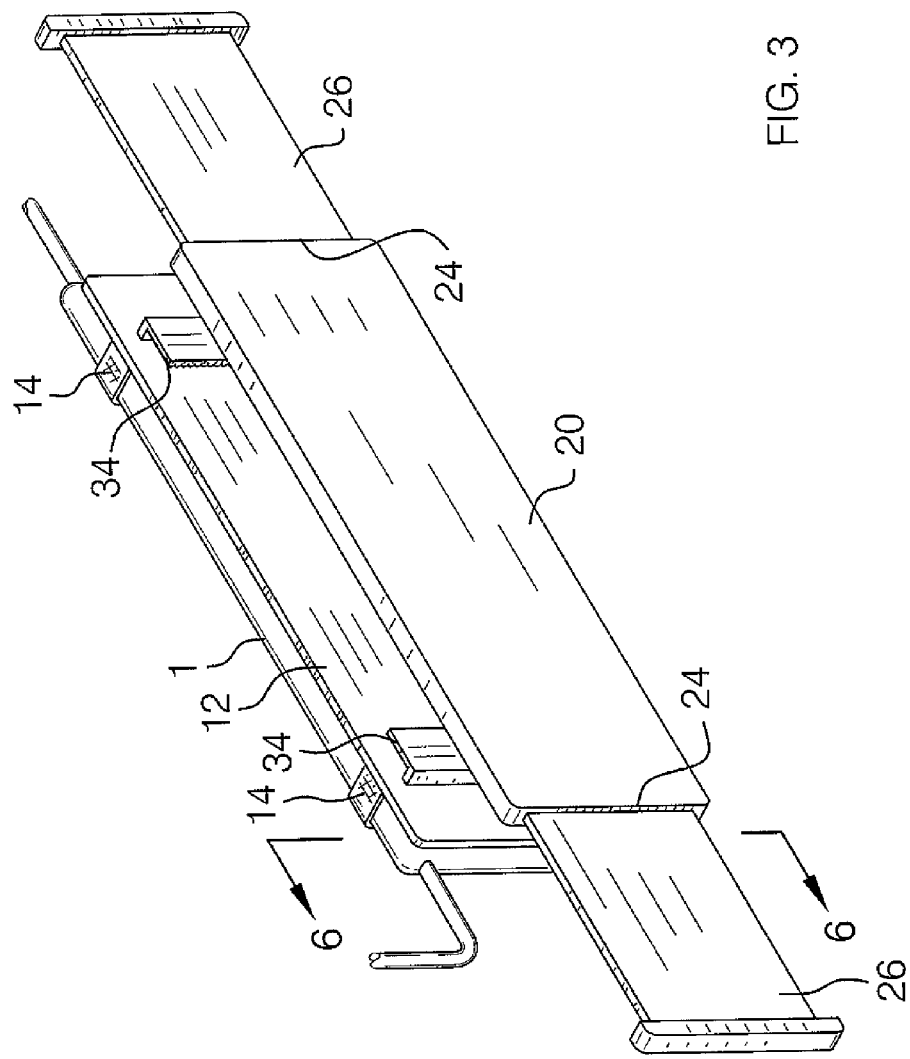
FIG. 3 is a front perspective view of the present invention shown in place on a sun visor.
Figure 4:
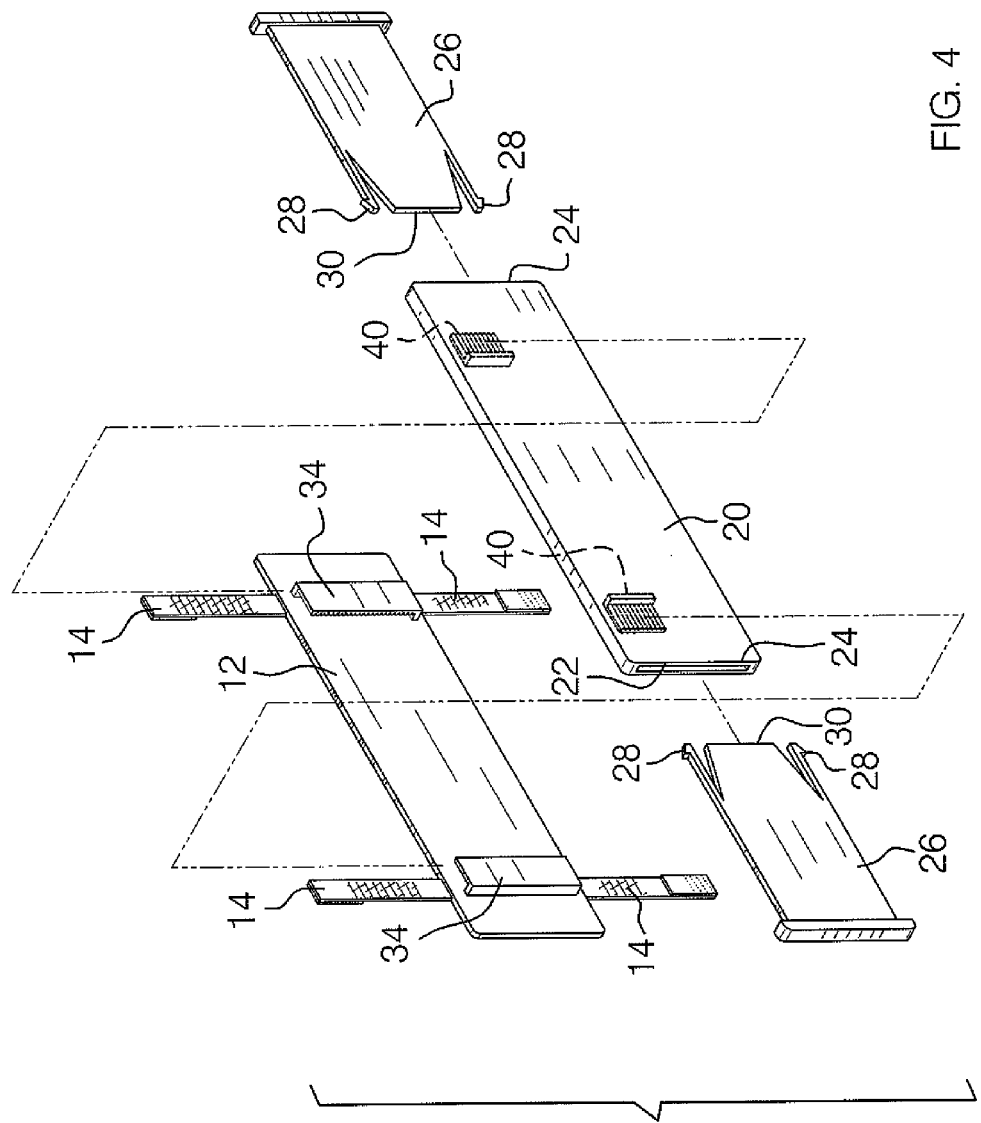
FIG. 4 is an explode perspective view of the present invention.
Figure 5:
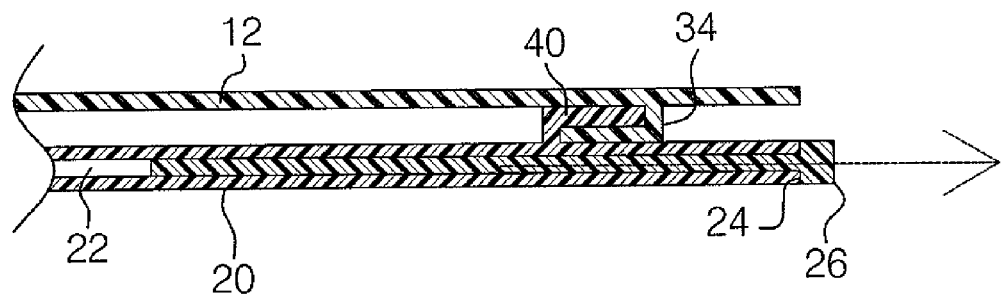
FIG. 5 is a cross-sectional view of the present invention taken along line 5-5 of FIG. 1.
Figure 6:
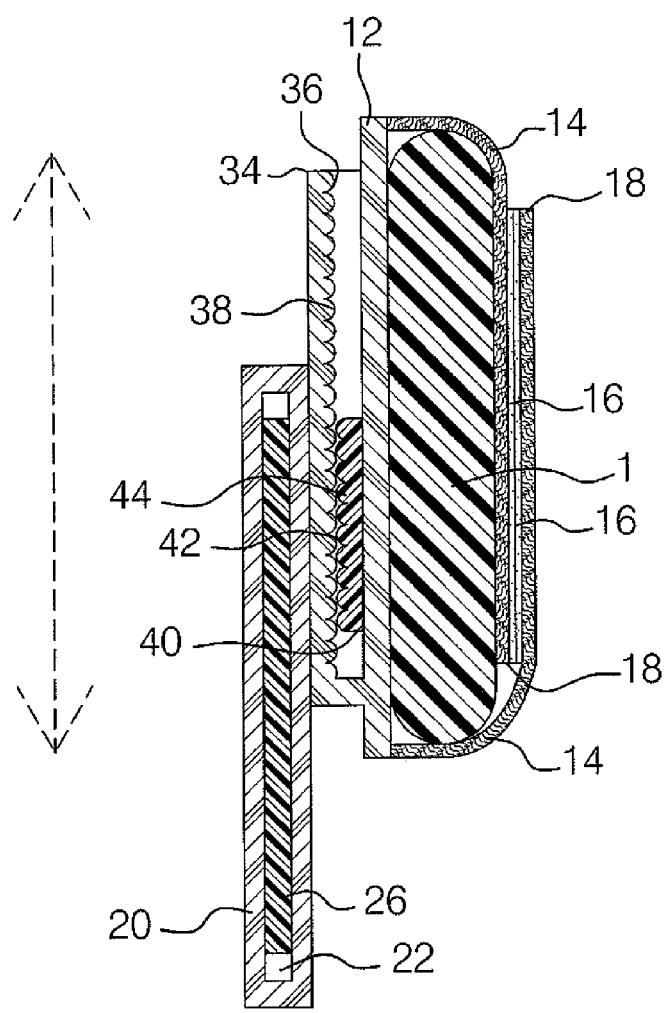
FIG. 6 is a cross-sectional view of the present invention taken along line 6-6 of FIG. 3.

With reference now to the drawings, and in particular to FIGS. 1 through 8 thereof, a new auxiliary sun visor embodying the principles and concepts of the present invention and generally designated by the reference numeral 10 will be described.

As best illustrated in FIGS. 1 through 8, the visor extension device 10 generally comprises a plate 12 being mountable to a sun visor 1. A plurality of straps 14 is coupled to the plate 12. The straps 14 are extendable around the sun visor 1 to secure the plate 12 to the sun visor 1. One of the straps 14 is vertically aligned with another one of the straps 14. Each of the straps 14 has one of a plurality of fasteners 16 coupled thereto and positioned adjacent a free end 18 of the associated one of the straps 14. The fasteners 16 of an aligned pair of the straps 14 are secured to each other to secure the straps 14 around the sun visor 1. The fasteners 16 may be comprised of hook and loop fastener.

A sleeve 20 is slidably mounted to the plate 12. The sleeve 20 is downwardly extended from the plate 12 to provide additional blocking of light below the sun visor 1. The sleeve 20 has a slot 22 extending through the sleeve 20 and through opposing ends 24 of the sleeve 20. The sleeve 20 has a length of approximately 20 inches and a width of approximately 6 inches.

Each of the opposing ends 24 of the sleeve 20 slidably receives one of a plurality of extension plates 26. The extension plates 26 are selectively extendable from the associated one of the opposing ends 24 to block light to the sides of the sun visor 1. Each of the extension plates 26 includes a pair of tabs 28 being positioned adjacent an interior end 30 of the associated one of said extension plates 26. Each of the opposing ends 24 of the sleeve 20 has a shoulder 32 positioned adjacent thereto. The tabs 28 of each of the extension plates 26 abut the shoulder 32 adjacent the associated one of the opposing ends 24 to inhibit inadvertent removal of the extension plates 26 from the sleeve 20. The tabs 28 may be pressed towards one another to allow the tabs 28 to pass through the associated one of the opposing ends 24 to allow the associated one of the extension plates 26 to be removed from the sleeve 20. Each of the extension plates 26 has a length of approximately 8 inches and a width between approximately 4 inches and approximately 5 inches.

A pair of support brackets 34 is coupled to the plate 12. Each of the support brackets 34 is approximately L-shaped. An interior face 36 of each of the brackets includes a ribbed section 38. A pair of mounting brackets 40 is coupled to sleeve 20. The mounting brackets 40 mesh with the support brackets 34 to mount the sleeve 20 to the plate 12. An inner face 42 of each of the mounting brackets 40 has a ridged section 44. The ridged section 44 of one of the mounting brackets 40 abuts the ribbed section 38 of an associated one of the support brackets 34 to enhance frictional contact between the mounting brackets 40 and the support brackets 34 and inhibit inadvertent sliding of the sleeve 20 with respect to the plate 12. Each of the mounting brackets 40 is approximately L-shaped.

In use, the plate 12 is positioned against the sun visor 1 and the straps 14 are extended around and secured to mount the plate 12 to the sun visor 1. The sleeve 20 can then bee adjusted downwardly to extend below the sun visor 1 when required.

The extension plates 26 can be extended from the opposing ends 24 of the sleeve 20 to provide to block the sun where the sun visor 1 is not able to. The extension plates 26 and the sleeve 20 can be made of a tinted transparent material or be of an opaque material.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A visor extension device for mounting to a sun visor of a vehicle, said device comprising:
   a plate being mountable to the sun visor;
   a sleeve being slidably mounted to said plate, said sleeve being downwardly extended from said plate to provide additional blocking of light below the sun visor, said sleeve having a slot extending through said sleeve and through opposing ends of said sleeve;
   a plurality of extension plates, each of said opposing ends of said sleeve slidably receiving one of said extension plates, said extension plates being selectively extendable from the associated one of said opposing ends to block light to the sides of the sun visor; and
   a pair of tabs being positioned adjacent an interior end of the associated one of said extension plates, each of said opposing ends of said sleeve having a shoulder positioned ad adjacent thereto, said tabs of each of said extension plates abutting said shoulder adjacent to an associated one of the opposing ends to inhibit inadvertent removal of said extension plates from said sleeve, and said tabs extending beyond the respective opposing ends of said sleeve to allow manual pressure to be applied thereto, corresponding ones of said tabs being movable towards one another by said manual pressure to allow said tabs to pass through said associated one of the opposing ends to allow said extension plate having said tabs moved toward each other to be removed from said sleeve.

2. The device according to claim 1, further comprising a pair of support brackets being coupled to said plate.

3. The device according to claim 2, wherein each of said support brackets is approximately L-shaped.

4. The device according to claim 2, further comprising a pair of mounting brackets being coupled to sleeve, said mounting brackets meshing with said support brackets to mount said sleeve to said plate.

5. The device according to claim 4, wherein an interior face of each of said support brackets includes a ribbed section, an inner face of each of said mounting brackets having a ridged section, said ridged section of one of said mounting brackets abutting said ribbed section of an associated one of said support brackets to enhance frictional contact between said mounting brackets and said support brackets and inhibit inadvertent sliding of said sleeve with respect to said plate.

6. The device according to claim 4, wherein each of said mounting brackets is approximately L-shaped.

7. The device according to claim 1, further comprising a plurality of straps being coupled to said plate, said straps being extendable around the sun visor to secure said plate to the sun visor.

8. The device according to claim 7, wherein one of said straps is vertically aligned with another one of said straps, each of said straps having one of a plurality of fasteners coupled thereto and positioned adjacent a free end of the associated one of said straps, said fasteners of an aligned pair of said straps securing to each other to secure said straps around the sun visor.

9. A visor extension device for mounting to a sun visor of a vehicle, said device comprising:
   a plate being mountable to the sun visor;
   a sleeve being slidably mounted to said plate, said sleeve being downwardly extended from said plate to provide additional blocking of light below the sun visor, said sleeve having a slot extending through said sleeve and through opposing ends of said sleeve;
   a plurality of extension plates, each of said opposing ends of said sleeve slidably receiving one of said extension plates, said extension plates being selectively extendable from the associated one of said opposing ends to block light to the sides of the sun visor;
   a pair of support brackets being coupled to said plate, each of said support brackets being approximately L-shaped, an interior face of each of said brackets including a ribbed section;
   a pair of mounting brackets being coupled to sleeve, said mounting brackets meshing with said support brackets to mount said sleeve to said plate, an inner face of each of said mounting brackets having a ridged section, said ridged section of one of said mounting brackets abutting said ribbed section of an associated one of said support brackets to enhance frictional contact between said mounting brackets and said support brackets and inhibit inadvertent sliding of said sleeve with respect to said plate, each of said mounting brackets being approximately L-shaped;
   a plurality of straps being coupled to said plate, said straps being extendable around the sun visor to secure said plate to the sun visor, one of said straps being vertically aligned with another one of said straps, each of said straps having one of a plurality of fasteners coupled thereto and positioned adjacent a free end of the associated one of said straps, said fasteners of an aligned pair of said straps securing to each other to secure said straps around the sun visor; and
   a pair of tabs being positioned adjacent an interior end of the associated one of said extension plates, each of said opposing ends of said sleeve having a shoulder positioned adjacent thereto, said tabs of each of said extension plates abutting said shoulder adjacent to an associated one of the opposing ends to inhibit inadvertent removal of said extension plates from said sleeve, and said tabs extending beyond the respective opposing ends of said sleeve to allow manual pressure to be applied thereto, corresponding ones of said tabs being movable towards one another by said manual pressure to allow said tabs to pass through said associated one of the opposing ends to allow said extension plate having said tabs moved toward each other to be removed from said sleeve.

* * * * *